(12) United States Patent
Terry et al.

(10) Patent No.: US 8,175,014 B2
(45) Date of Patent: May 8, 2012

(54) METHOD AND APPARATUS FOR USING A RELAY TO PROVIDE PHYSICAL AND HYBRID AUTOMATIC REPEAT REQUEST FUNCTIONALITIES

(75) Inventors: Stephen E. Terry, Northport, NY (US); Prabhakar R. Chitrapu, Blue Bell, PA (US); Mohammed Sammour, Alrabieh (JO)

(73) Assignee: Interdigital Patent Holdings, Inc., Wilmington, DE (US)

( * ) Notice: Subject to any disclaimer, the term of this patent is extended or adjusted under 35 U.S.C. 154(b) by 335 days.

(21) Appl. No.: 12/538,348

(22) Filed: Aug. 10, 2009
(Under 37 CFR 1.47)

(65) Prior Publication Data
US 2010/0296431 A1 Nov. 25, 2010

Related U.S. Application Data

(60) Provisional application No. 61/188,716, filed on Aug. 11, 2008.

(51) Int. Cl.
*H04L 12/56* (2006.01)
*H04J 1/16* (2006.01)

(52) U.S. Cl. ......... 370/278; 370/252; 370/329; 370/241

(58) Field of Classification Search ................... 370/252, 370/278, 329, 241
See application file for complete search history.

(56) References Cited

U.S. PATENT DOCUMENTS

| 2007/0121529 A1 | 5/2007 | Meier |
| 2008/0068979 A1 | 3/2008 | Visotsky et al. |
| 2009/0323770 A1* | 12/2009 | Venkatachalam et al. ..... 375/133 |

FOREIGN PATENT DOCUMENTS

WO 2007/053950 5/2007

OTHER PUBLICATIONS

Third Generation Partnership Project, "Technical Specification Group Radio Access Network; Evolved Univeral Terrestrial Radio Access (E-UTRA) and Evolved Universal Terrestrial Radio Access network (E-UTRAN); Overall Description; Stage 2 (Release 8)", 3GPP TS 36.300, V8.5.0 (May 2008).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.9.0 (Jun. 2009).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 9)", 3GPP TS 36.300, V9.0.0 (Jun. 2009).

Third Generation Partnership Project, "Technical Specification Group Radio Access Network; Evolved Universal Teerrestrial Radio Access (E-UTRA) Medium Access Control (MAC) Protocol Specification (Release 8)", 3GPP TS 36.321, V8.2.0, (May 2008).

(Continued)

*Primary Examiner* — John Pezzlo
(74) *Attorney, Agent, or Firm* — Condo Roccia LLP

(57) ABSTRACT

Methods and apparatus are described for performing automatic repeat request (ARQ) and hybrid-ARQ (HARQ) assisted ARQ procedures in a relay-based wireless communication system. Triggers for radio link control (RLC)/ARQ retransmissions and RLC/ARQ status reporting are also described.

47 Claims, 11 Drawing Sheets

OTHER PUBLICATIONS

Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.6.0, (Jun. 2009).

Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V8.2.0, (May 2008).

Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V8.6.0, (Jun. 2009).

Soldani et al., "Wireless Relays for Broadband Access," IEEE Communications Magazine, vol. 45, No. 3, pp. 58-66 (Mar. 2008).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.5.0 (May 2008).

Third Generation Partnership Project, "Technical Specification Group Radio Access Network; Evolved Univeral Terrestrial Radio Access (E-UTRA) and Evolved Universal Terrestrial Radio Access network (E-UTRAN); Overall Description; Stage 2 (Release 8)", 3GPP TS 36.300, V8.9.0 (Jun. 2009).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 9)", 3GPP TS 36.300, V9.0.0 (Jun. 2009).

Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.2.0, (May 2008).

Third Generation Partnership Project, "Technical Specification Group Radio Access Network; Evolved Universal Terrestrial Radio Access (E-UTRA) Medium Access Control (MAC) Protocol Specification (Release 8)", 3 GPP TS 36.321, V8.6.0, (Jun. 2009).

* cited by examiner

US 8,175,014 B2

METHOD AND APPARATUS FOR USING A RELAY TO PROVIDE PHYSICAL AND HYBRID AUTOMATIC REPEAT REQUEST FUNCTIONALITIES

CROSS REFERENCE TO RELATED APPLICATIONS

This application claims the benefit of U.S. Provisional Application No. 61/188,716 filed Aug. 11, 2008, which is incorporated by reference as if fully set forth.

FIELD OF INVENTION

This application is related to wireless communications.

BACKGROUND

FIG. 1 shows a third generation partnership project (3GPP) long term evolution (LTE) user-plane protocol stack 100. A wireless transmit/receive unit (WTRU) 105 and a Node-B 110 transmit and receive data at different protocols/levels, (e.g., physical (PHY) layer 115, media access control (MAC) layer 120, radio link control (RLC) layer 125, and packet data convergence protocol (PDCP) layer 130). Each protocol layer performs a variety of functions.

The MAC layer 120 provides a hybrid automatic repeat request (HARQ) retransmission functionality whereby a transmitting MAC/HARQ entity retransmits failed MAC/HARQ protocol data units (PDUs), depending on the HARQ positive acknowledgement (ACK)/negative acknowledgement (NACK) feedback that is transmitted by a receiving MAC/HARQ entity.

The RLC layer 125 provides ARQ retransmission functionality whereby the transmitting side of an acknowledged mode (AM) RLC entity retransmits any failed RLC PDUs based an RLC status report transmitted by the receiving side of the AM RLC entity, or based on an indication of a failed MAC/HARQ delivery from a transmitting MAC/HARQ entity.

FIG. 2 is an example illustrating ARQ and HARQ-assisted ARQ operations in LTE. FIG. 2 shows a wireless communication system 200 including a transmitter 205 and a receiver 210. The transmitter 205 includes an RLC/ARQ unit 215 and a MAC/HARQ unit 220. The receiver 210 includes an RLC/ARQ unit 225 and a MAC/HARQ unit 230. The term "transmitter" refers to a transmitting node, which resides in a WTRU for uplink data and a Node-B for downlink data. The term "receiver" refers to a receiving node, which resides in a Node-B for uplink data and a WTRU for downlink data.

An HARQ failure occurs if an HARQ entity does not receive a positive HARQ ACK after a predetermined number of HARQ transmissions. To simplify the example, assume that HARQ delivery failure occurs if the HARQ entity transmits the HARQ PDU twice and does not receive an HARQ ACK.

The RLC/ARQ entity 215 in the transmitter 205 creates an RLC PDU and submits it to the MAC/HARQ unit 220, also in the transmitter 205. The MAC/HARQ unit 220 then transmits a MAC PDU that contains the RLC PDU a predetermined number of times, (e.g. twice), unsuccessfully. Hence, the HARQ process fails to deliver the MAC PDU to the receiver 210. The HARQ process failure triggers a local NACK, (i.e., HARQ assisted ARQ), indication, whereby the MAC/HARQ unit 220 notifies the RLC/ARQ unit 215 of the failed delivery of the RLC PDU. The RLC/ARQ unit 215 initiates an ARQ retransmission of the failed RLC PDU, and submits the retransmitted RLC PDU to the MAC/HARQ unit 220. The MAC/HARQ unit 220 then transmits a MAC PDU that contains the RLC PDU once unsuccessfully. An error may occur on the HARQ feedback, whereby the NACK transmitted by the receiver 210 is erroneously received as an ACK at the transmitter 205. The RLC/ARQ unit 225 in the receiver 210 may transmit an RLC/ARQ status report that positively or negatively acknowledges data, (i.e., ARQ ACK/NACK). The RLC/ARQ status report may be transmitted in several steps, (i.e., via MAC/HARQ, and the like), but for simplifying FIG. 2, it is shown via an end-to-end line. The transmitter 205 checks the RLC/ARQ status report it received, and determines that the RLC PDU is not positively acknowledged. Consequently, the RLC/ARQ unit 215 initiates an ARQ retransmission of the failed RLC PDU, and submits the retransmitted RLC PDU to the MAC/HARQ unit 220. The MAC/HARQ unit 220 transmits the MAC PDU that contains the RLC PDU a predetermined number of attempts, and is successful. The MAC/HARQ unit 230 in the receiver 210 delivers the successfully received packet to the RLC/ARQ unit 225. The RLC/ARQ unit 225 may transmit an RLC/ARQ status report that positively or negatively acknowledges the data. The transmitter 205 checks the RLC/ARQ status report it received, and determines that the RLC PDU is positively acknowledged. Consequently, successful delivery is confirmed, and no further ARQ retransmission is required.

The procedure shown in FIG. 2 is simplified to illustrate an exemplary procedure, however, more functions may be performed. For example, RLC re-segmentation may be performed, whereby instead of re-transmitting a whole RLC PDU in one transmission, the RLC PDU may be re-segmented into multiple RLC PDU segments.

In some implementations, a local NACK (HARQ assisted ARQ) may not be implemented, and in this case an ARQ retransmission will only be triggered via RLC/ARQ status reports.

Recently proposals have been introduced for LTE-advanced, which features additional improvements to LTE. LTE-advanced (LTE-A) will present a significant enhancement over LTE, e.g., peak data rates of 0.5 Gbps in uplink and 1.0 Gbps in downlink.

The use of "relays" is one of the technologies being considered for LTE advanced. FIG. 3 shows exemplary uses of relays in a cellular communication system. When referred to herein, the term 'relay' may refer to a "relay node", or an intermediary node, that may provide a link between a Node-B and a WTRU.

Accordingly, effective, efficient and fast ARQ retransmissions with relays are desired.

SUMMARY

Methods and apparatus are described for performing ARQ and HARQ assisted ARQ procedures in a relay-based wireless communication system. Triggers for RLC/ARQ retransmissions and RLC/ARQ status reporting are also described.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
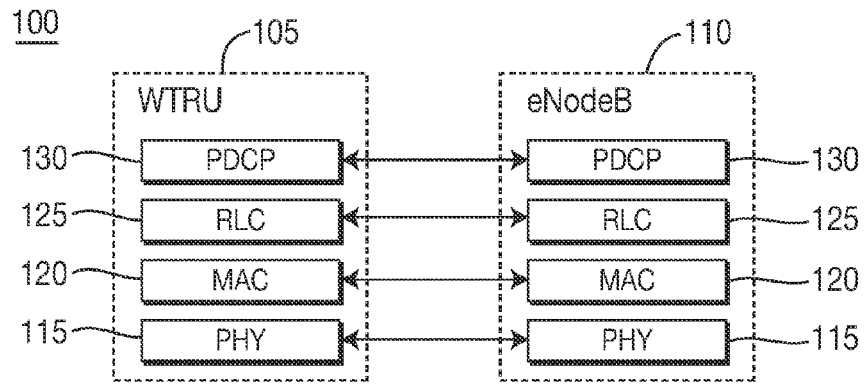
FIG. 1 shows an LTE user-plane protocol stack.
Figure 2:
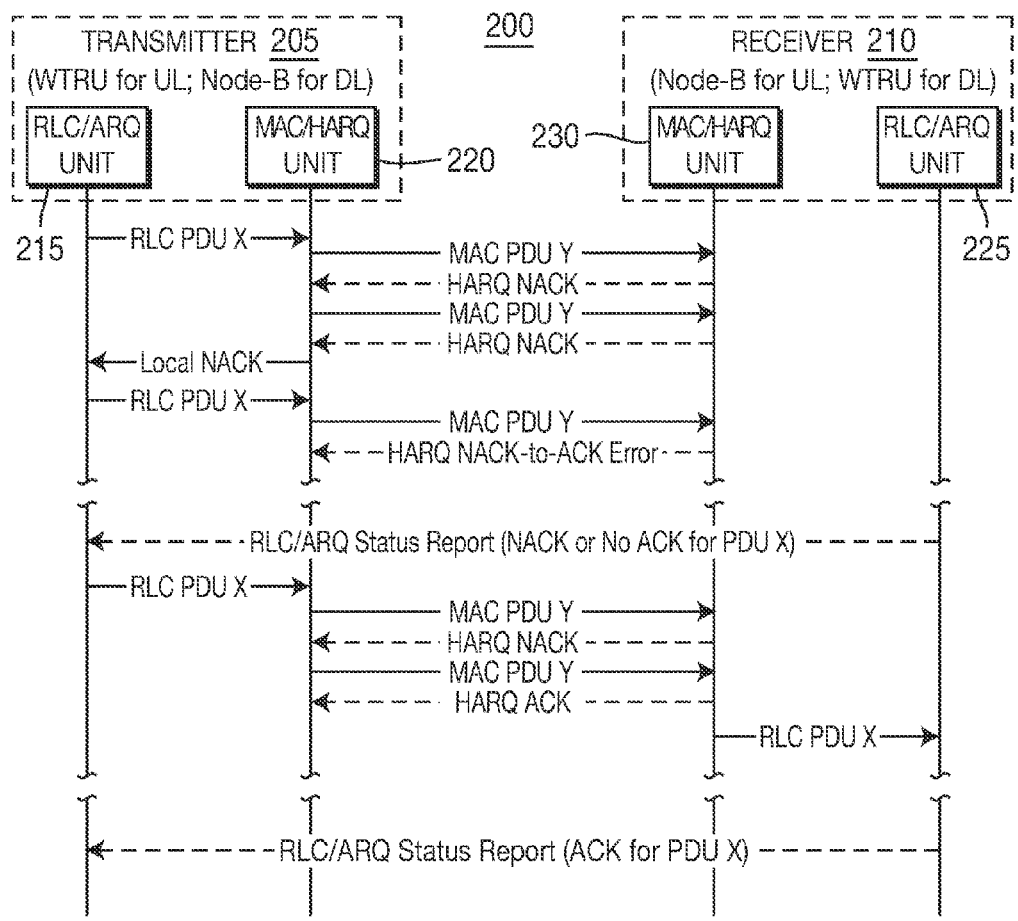
FIG. 2 shows an example HARQ and ARQ operations in LTE.
Figure 3:
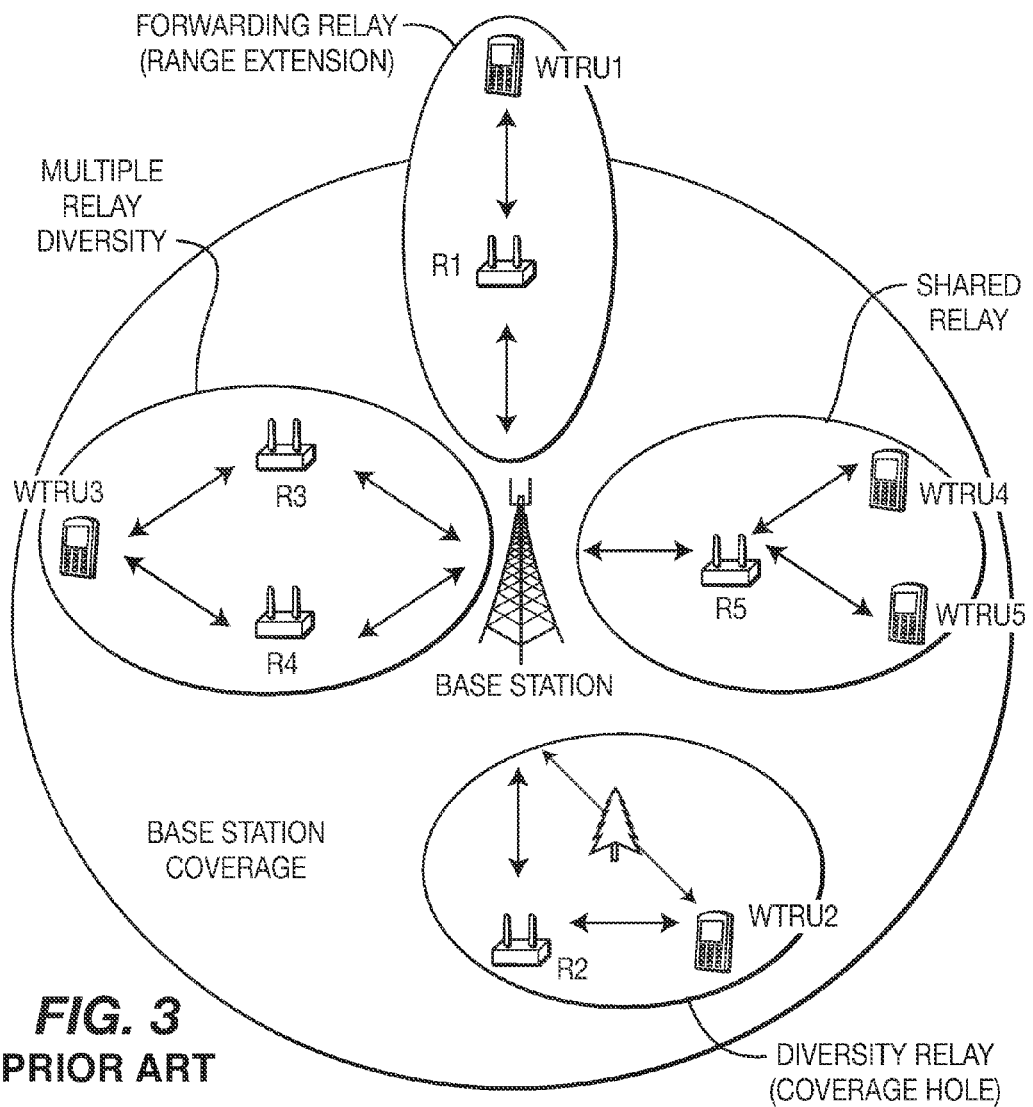
FIG. 3 shows an example of relays in a cellular network.
Figure 4:
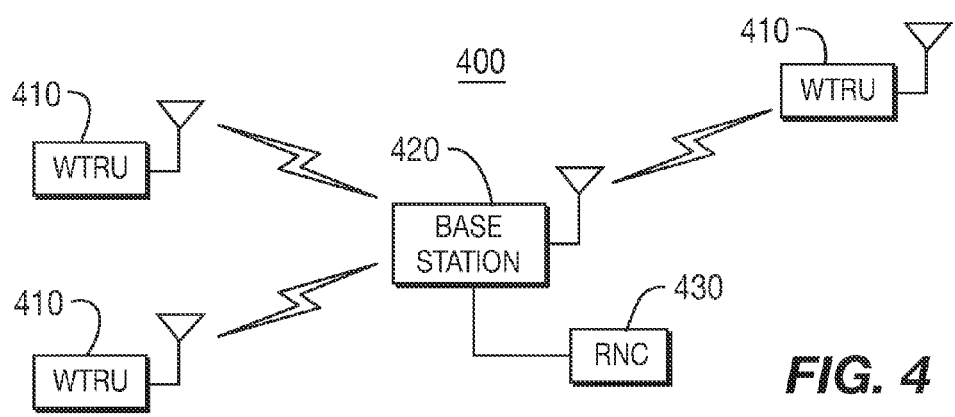
FIG. 4 shows an example of a wireless communication system including a plurality of WTRUs, a base station, and a radio network controller (RNC)

FIG. 4 shows a wireless communication system 400 including a plurality of WTRUs 410, a base station 420, and an RNC 430. As shown in FIG. 4, the WTRUs 410 are in communication with the base station 420, which is in communication with the RNC 430. Although three WTRUs 410, one base station 420, and one RNC 430 are shown in FIG. 4, it should be noted that any combination of wireless and wired devices may be included in the wireless communication system 400. For example, although the RNC 430 is shown in the wireless communication system 400, the RNC 430 may not be included in an LTE system.

Figure 5:
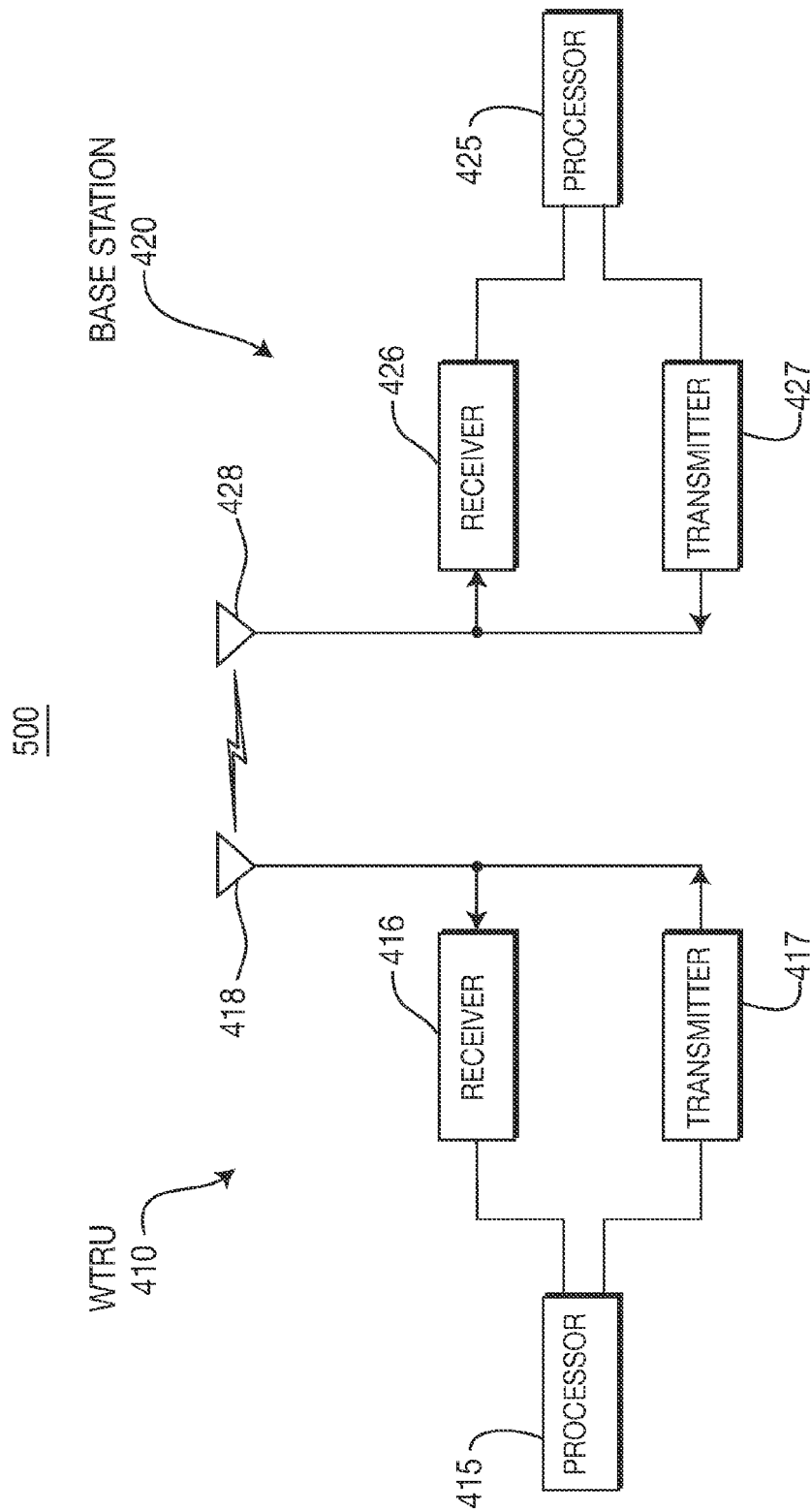
FIG. 5 is a functional block diagram of a WTRU and the base station of FIG. 4.

FIG. 5 is a functional block diagram 500 of a WTRU 410 and the base station 420 of the wireless communication system 400 of FIG. 4. As shown in FIG. 5, the WTRU 410 is in communication with the base station 420 and both are configured to perform a method of ARQ and HARQ assisted ARQ enhancements for relay-based wireless communications.

In addition to the components that may be found in a typical WTRU, the WTRU 410 includes a processor 415, a receiver 416, a transmitter 417, and an antenna 418. The processor 415 is configured to perform a method for ARQ and HARQ assisted ARQ enhancements for relay-based wireless communications. The receiver 416 and the transmitter 417 are in communication with the processor 415. The antenna 418 is in communication with both the receiver 416 and the transmitter 417 to facilitate the transmission and reception of wireless data.

In addition to the components that may be found in a typical base station, the base station 420 includes a processor 425, a receiver 426, a transmitter 427, and an antenna 428. The processor 425 is configured to perform a method for ARQ and HARQ assisted ARQ enhancements for relay-based wireless communications. The receiver 426 and the transmitter 427 are in communication with the processor 425. The antenna 428 is in communication with both the receiver 526 and the transmitter 427 to facilitate the transmission and reception of wireless data.

Figure 6:
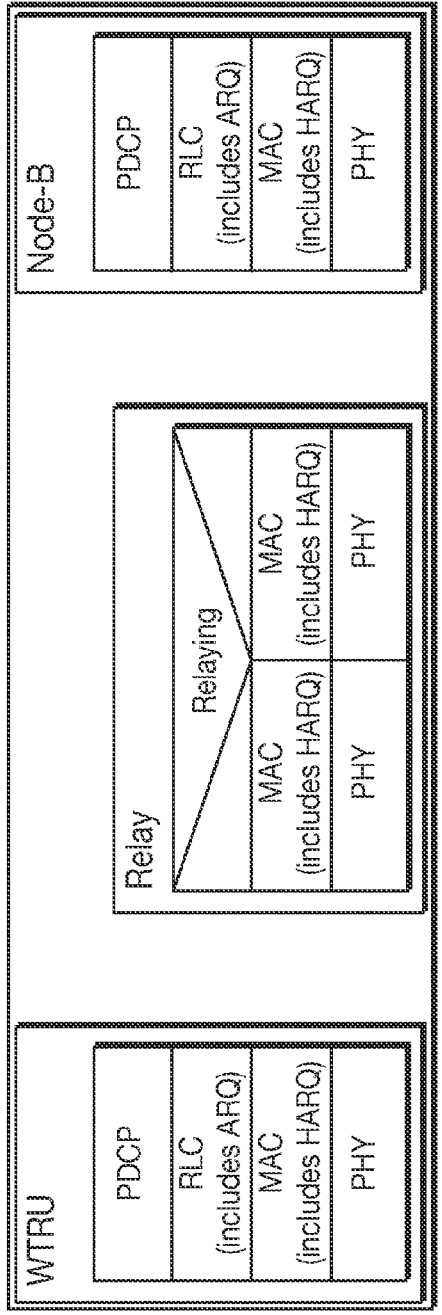
FIG. 6 shows a relay that has MAC and PHY functions.

FIG. 6 shows a relay incorporating MAC and PHY functions. MAC and PHY transmissions from the Node-B and WTRU are locally terminated at the relay node. RLC and PDCP transmissions can be transparent to the relay node.

Figure 7:
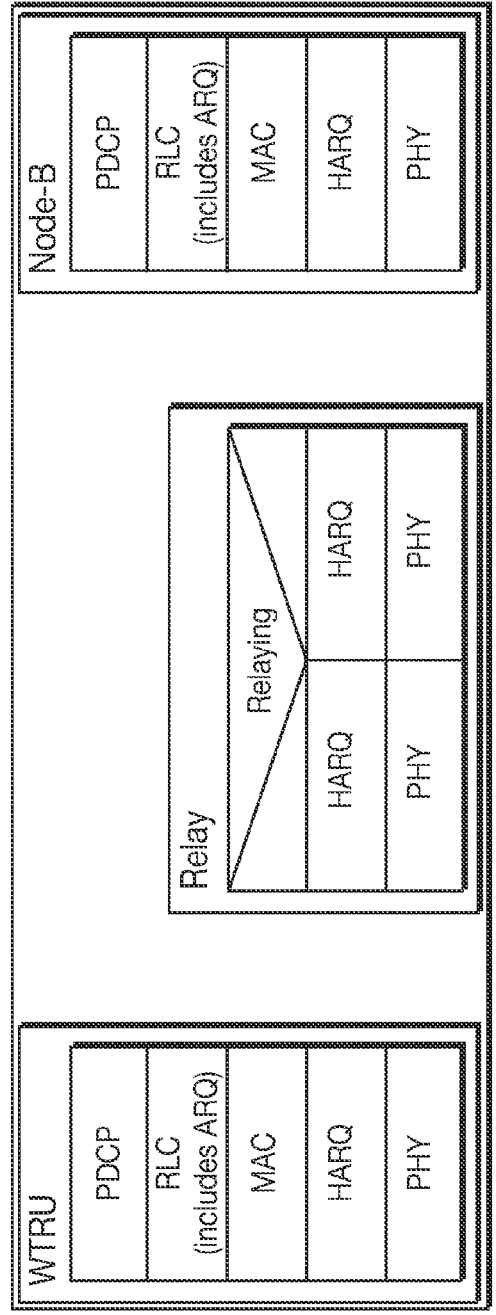
FIG. 7 shows a relay that has HARQ and PHY functions.

FIG. 7 shows a relay that provides PHY and HARQ functionalities. HARQ and PHY transmissions from the Node-B and WTRU are locally terminated at the relay node. Other MAC, RLC and PDCP transmissions can be transparent to the relay node. The relay may further provide other MAC functionalities (in addition to HARQ) as shown in FIG. 6. Other relay architectures may also be used, such as a relay that provides even higher layer functionalities, (i.e., RLC or PDCP functionalities), or a relay that provides only a PHY, (i.e., with no HARQ), functionality. In this case, other higher layer protocols, (i.e., RLC and PDCP), could also be locally terminated at the relay node. The HARQ and MAC protocol termination in the relay node are not necessarily affected by the possible termination of these higher layer protocols in the relay node.

The WTRU and the Node-B may be configured to provide the PHY, MAC, RLC and PDCP functionalities as shown in FIG. 6 and FIG. 7.

The HARQ layer is generally modeled as part of the MAC layer. FIG. 7, however, shows the HARQ layer in its own box in order to highlight such function.

Figure 8:
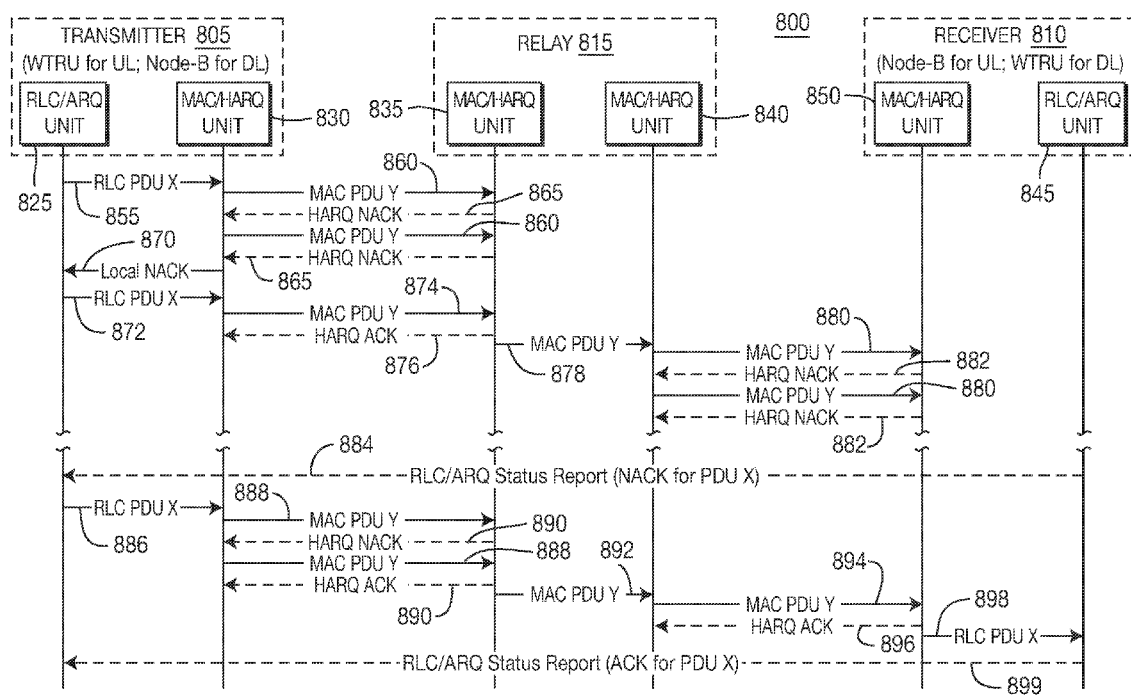
FIG. 8 shows HARQ and ARQ operations in LTE with a relay.

FIG. 8 shows an example of HARQ and ARQ operations in LTE using a relay. FIG. 8 shows a wireless communication system 800 including a transmitter 805, a receiver 810 and a relay 815. The transmitter 805 includes an RLC/ARQ unit 825 and a MAC/HARQ unit 830. The relay 815 includes MAC/HARQ units 835 and 840. The receiver 810 includes an RLC/ARQ unit 845 and a MAC/HARQ unit 850. The term MAC PDU Y is used to indicate any MAC PDU that contains the data of RLC PDU X. The multiple ARQ retransmissions of RLC PDU X may be encapsulated in different MAC PDUs each time an RLC/ARQ retransmission is performed, but the term MAC PDU Y may be used to refer to any MAC PDU that contains RLC PDU X or a portion of RLC PDU X. The MAC PDU Y may either concatenate several RLC PDUs including RLC PDU X, or segment RLC PDU X into several MAC PDU Y's.

Referring to FIG. 8, the RLC/ARQ unit 825 in the transmitter 805 generates an RLC PDU X and submits it to the MAC/HARQ unit 830 via signal 855. The MAC/HARQ unit 830 then transmits a MAC PDU Y that contains the RLC PDU X, (or a portion for the RLC PDU), to the MAC/HARQ unit 835 in the relay 815 a predetermined number of times via signals 860, (e.g., twice in this example), unsuccessfully. However, the HARQ process fails to successfully deliver the MAC PDU Y to the relay 815, as indicated by HARQ NACK signals 865 sent by the MAC/HARQ 835 in the relay 815 to the transmitter 805. The HARQ process failure triggers a local NACK 870, (i.e., HARQ assisted ARQ), indication, whereby the MAC/HARQ unit 830 notifies the RLC/ARQ unit 825 of the failed delivery of the MAC PDU Y. The RLC/ARQ unit 825 initiates an ARQ retransmission of the failed RLC PDU X, and submits the retransmitted RLC PDU X to the MAC/HARQ unit 830 via signal 872. The MAC/HARQ unit 830 in the transmitter 805 successfully transmits the MAC PDU Y that contains the RLC PDU X to the MAC/HARQ unit 835 in the relay 815 via signal 874, as indicated by HARQ ARQ signal 876. In the relay 815, the MAC/HARQ unit 835 forwards the MAC PDU Y to the MAC/HARQ unit 840 via signal 878. The MAC/HARQ unit 840 in the relay 815 unsuccessfully transmits the MAC PDU Y that contains the RLC PDU X to the receiver 810 a predetermined number of times 880, as indicated by HARQ NACK signals 882 sent by the MAC/HARQ unit 850 in the receiver 810 to the MAC/HARQ unit 840 in the relay 815. Hence, the HARQ process fails to deliver the MAC PDU Y to the receiver 810.

The RLC/ARQ unit 845 in the receiver 810 may transmit an RLC/ARQ status report 884 that positively or negatively acknowledges data to the RLC/ARQ unit 825 in the transmitter 805. Then, the transmitter 805 checks the RLC/ARQ status report 884, and if the RLC PDU X was not positively acknowledged, the RLC/ARQ unit 825 in the transmitter 805 initiates ARQ retransmission 886 of the RLC PDU X, and submits the retransmitted RLC PDU X to the MAC/HARQ unit 830 in the transmitter 805. The MAC/HARQ unit 830 transmits the MAC PDU Y containing the RLC PDU X to the to the MAC/HARQ unit 835 in the relay 815 a predetermined number of times 888, and is successful as indicated by HARQ ACK signals 890 sent by the MAC/HARQ unit 835 in the relay 815 to the MAC/HARQ unit 830 in the transmitter 805.

In the relay 815, the MAC/HARQ unit 835 relays the MAC PDU Y to the MAC/HARQ unit 840 via signal 892. The MAC/HARQ unit 840 in the relay 815 transmits the MAC PDU Y that contains the RLC PDU X to the MAC/HARQ unit 850 in the receiver 810 a predetermined number of times 894, (e.g., once in this example), and is successful, as indicated by HARQ ACK signal 896 sent by the MAC/HARQ unit 850 in the receiver 810 to the MAC/HARQ unit 840 in the relay 815. In the receiver 810, the MAC/HARQ unit 850 delivers the successfully received packet to the RLC/ARQ unit 845 via signal 898. The RLC/ARQ unit 845 in the receiver 810 may transmit to the RLC/ARQ unit 825 in the transmitter 805 an RLC/ARQ status report 899 that positively or negatively acknowledges data. The transmitter 805 checks the RLC/ARQ status report and, if the RLC PDU is positively acknowledged, no further ARQ retransmission is required.

Enhanced System Operation

In some cases, additional time may be required for ARQ retransmission when a HARQ delivery failure occurs on the HARQ process between the relay 815 and the receiver 810. For example, additional time may be required to generate an RLC/ARQ status report that identifies that the RLC PDU was not successfully received by the RLC/ARQ unit 845 in the receiver 810, which will delay the eventual ARQ recovery. In order to speed up the ARQ retransmissions, enhancements are proposed as follows.

Signal from Relay to Transmitter in order to Trigger ARQ by the Transmitter

Figure 9:
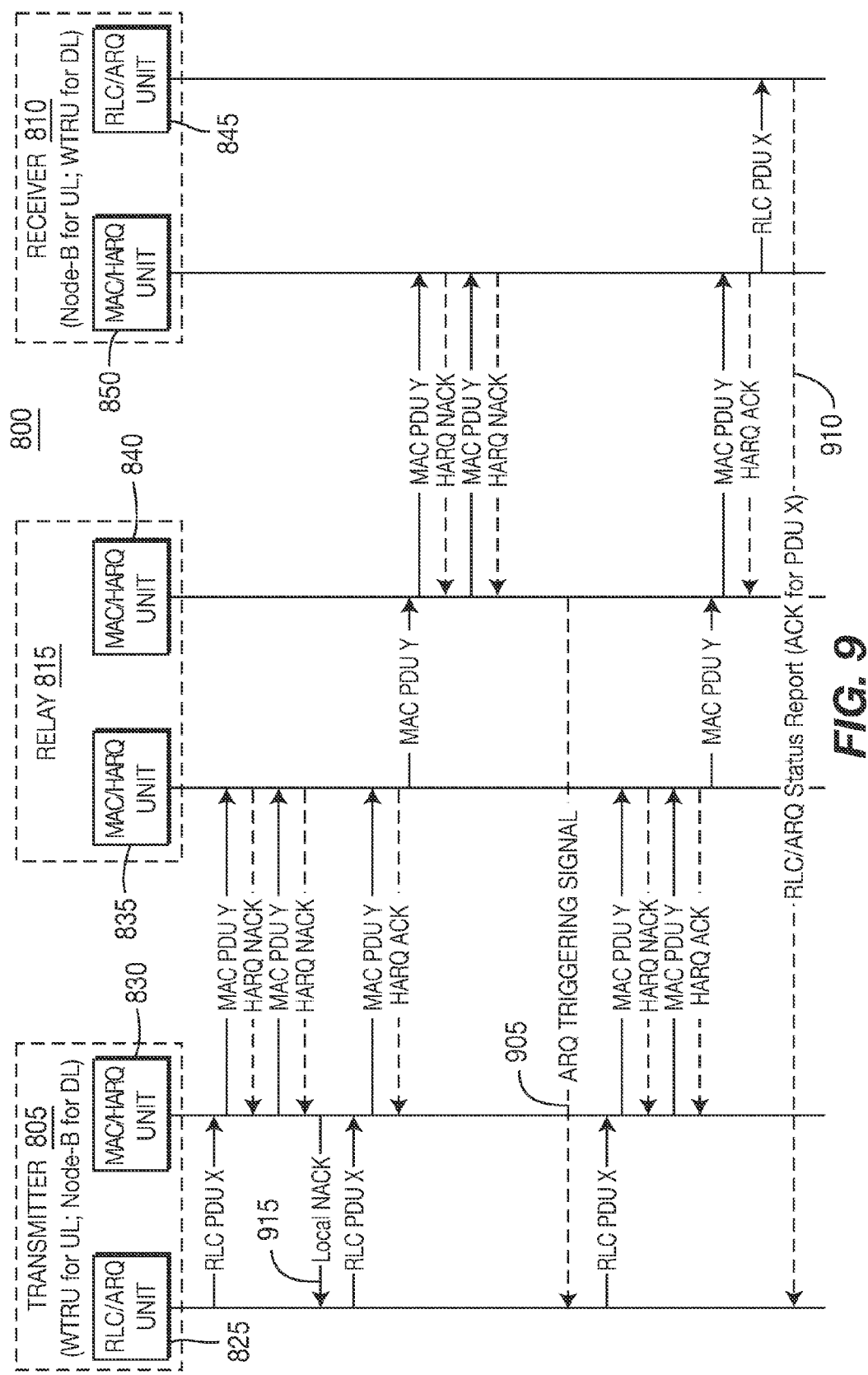
FIGS. 9-14 show examples of enhanced HARQ assisted ARQ operations.

As shown in FIG. 9, upon a MAC/HARQ failure of the HARQ process that operates between the MAC/HARQ unit 840 in the relay 815 and the MAC/HARQ unit 850 in the receiver 810, the MAC/HARQ unit 840 may create and transmit an ARQ triggering signal 905 to the RLC/ARQ unit 825 in the transmitter 805. The ARQ triggering signal 905 may be implemented in any protocol or layer, (e.g. a MAC control element, an RLC control PDU, a radio resource control (RRC) message/information element (IE)), or in any other protocol or layer. The ARQ triggering signal may include one or more of the following information:

1) the MAC logical channel identity (or logical channel identities) of those packets that were in the failed MAC PDU;
2) the identity (identifier) of the failed MAC PDU;
3) the transmission sequence number (TSN) of the failed MAC PDU;
4) the identity/identities of the RLC PDUs included in the failed MAC PDU, (e.g., RLC PDU SN and/or segment offset/length information);
5) the transmission time interval (TTI) of when failure occurred;
6) time of failure; and
7) HARQ process number of the failed HARQ process.

If the HARQ process in the relay 815 fails, the relay 815 may transmit a signal with minimal information, (i.e., there is no need for the relay 815 to decode (or spoof) the PDU). Alternatively, the relay 815 may decode (or spoof) the MAC PDU, and transmit some or all of the MAC PDU header information to the transmitter 805, or the relay 815 may decode (or spoof) the RLC PDU, and transmit some or all of the RLC PDU header information to the transmitter 805. If the relay 815 spoofs the RLC PDU header, then the ARQ triggering signal 905 transmitted from the relay 815 to the transmitter 805 may have the form of an RLC status report, which is transmitted from the relay 815 as opposed to being transmitted from the receiver 810.

Alternatively, the relay 815 may not need to transmit the ARQ triggering signal 905 if all of the data in the MAC PDU is not in an acknowledged mode (AM), (i.e., since no ARQ is provided for unacknowledged mode (UM) traffic).

In another alternative, before transmitting the ARQ triggering signal 905, the relay 815 may check/verify if any further PDUs have been recently received from transmitter 805. If the transmitter 805 recently retransmitted the packet that failed, then there is no need to transmit the ARQ triggering signal 905.

Upon receiving the ARQ triggering signal 905, the RLC/ARQ unit 825 in the transmitter 805 may conduct RLC/ARQ retransmissions. If sufficient identifiers are provided in the ARQ triggering signal 905, then the RLC/ARQ unit 825 may retransmit only the PDUs that are specified or implied from the provided identifiers. Alternatively, the RLC/ARQ unit 825 may estimate the RLC PDUs that need to be retransmitted, or can retransmit those RLC PDUs that have not yet been acknowledged by an RLC/ARQ status report 910. Alternatively, the RLC/ARQ unit 825 may transmit a polling request to the receiver 810, in order to receive an updated RLC/ARQ status report 910, and conduct an RLC/ARQ retransmission(s) based on the information conveyed in the received RLC/ARQ status report 910.

The RLC/ARQ retransmission by the transmitter 805 may be conducted/triggered a local NACK 915, (from the MAC/HARQ unit 830 to the RLC/ARQ unit 825 in the transmitter 805). Additionally, it may be triggered by an RLC/ARQ status report 910 transmitted by the receiver 810 to the transmitter 805, or it may be triggered by an ARQ triggering signal 905 transmitted by the relay 815 to the transmitter 805.

In case more than one trigger is generated, conflicts may be handled using an RLC/ARQ status report trigger. The RLC/ARQ status report trigger may be configured to over-ride/supersede any other triggers.

Alternatively, any trigger that contains a NACK may lead to PDU retransmission, or a timer may be used to prevent multiple retransmissions of the same PDU, if multiple triggers are received within a short time period.

Signal from Relay to Receiver in order to Trigger Status Reporting by the Receiver RLC/ARQ status reporting by the receiver 810 may be conducted/triggered by a status report triggering signal transmitted by the relay to the receiver.

Figure 10:
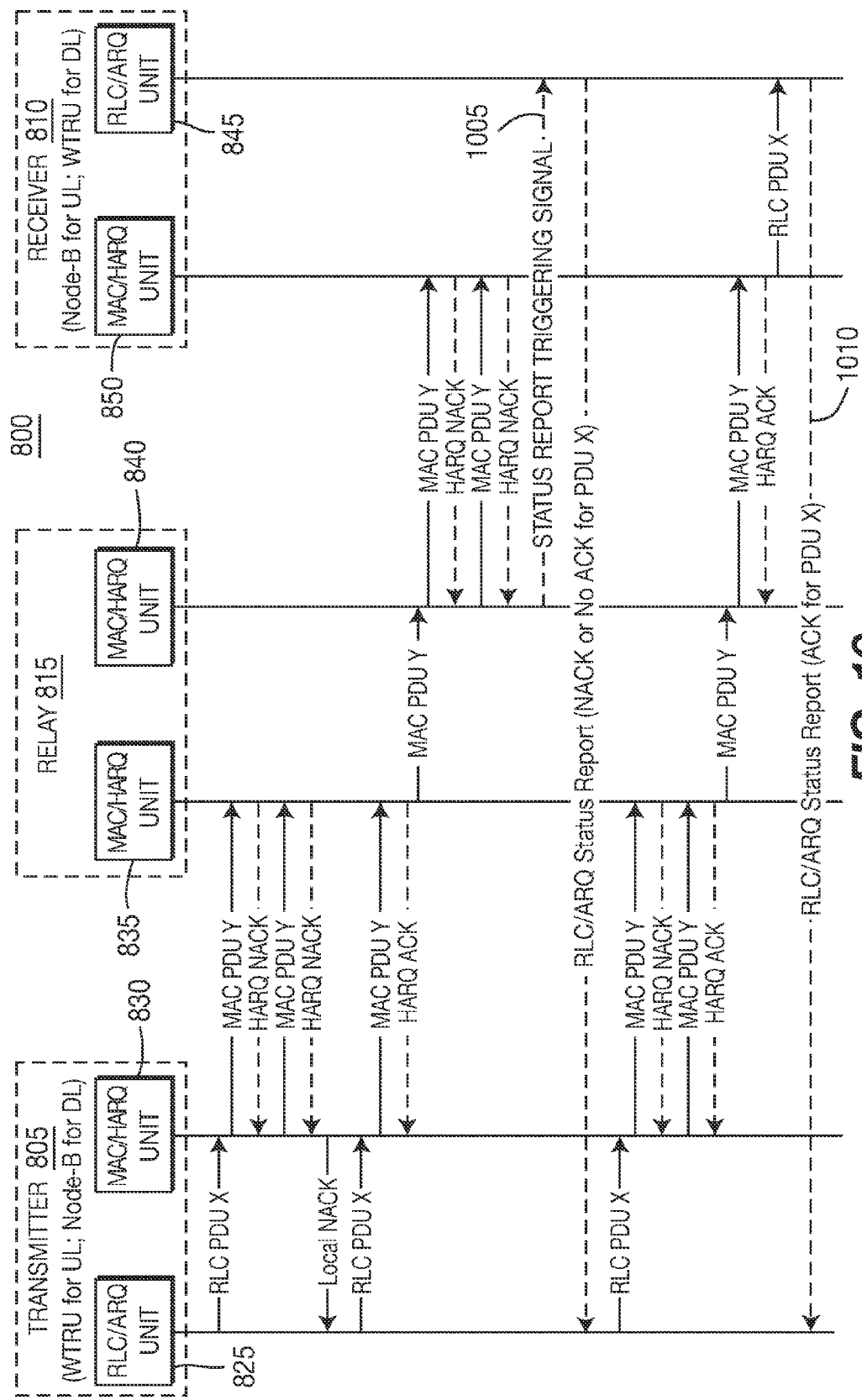

FIG. 10 shows a proposed enhanced HARQ assisted ARQ operation. As shown in FIG. 10, upon MAC/HARQ failure of the HARQ process that runs between the relay 815 and the receiver 810, the MAC/HARQ unit 840 in the relay 815 will generate and transmit a status report triggering signal 1005 to the receiver 810 in order to trigger transmission of an RLC status report.

The status report triggering signal 1005 may include the MAC logical channel identity (or logical channel identities) of those packets that were in the failed MAC PDU. Alternatively, the status report triggering signal 1005 may include one or a combination of the following:

1) identity (identifier) of the failed MAC PDU;
2) TSN of the failed MAC PDU;
3) identity/identities of the RLC PDUs included in the failed MAC PDU, (e.g., RLC PDU SN and/or segment offset/length information);
4) TTI when failure occurred;
5) time of failure; and
6) HARQ process number of the failed HARQ process.

When an HARQ process fails in the relay 815, the relay 815 may be configured to transmit a signal with minimal information, (i.e., no need for relay to decode (or spoof) the PDU). Alternatively, the relay 815 may be configured to decode (or spoof) the MAC PDU, and transmit some or all of the MAC PDU header information to the receiver 810, or the relay 815 may decode (or spoof) the RLC PDU, and transmit some or all of the RLC PDU header information to the receiver 810.

Alternatively, the relay 815 optionally does not need to transmit the status report triggering signal 1005 if all of the data in the MAC PDU Y is not associated with an RLC PDU X operating in AM, (i.e., not UM or transparent mode (TM)).

Alternatively, before transmitting the status report triggering signal 1005, the relay 815 may check/verify if any further PDUs have been recently received from the transmitter 805. If the transmitter 805 recently retransmitted the packet that failed, then there is no need to transmit the status report triggering signal 1005.

Upon receiving the status report triggering signal 1005, the RLC/ARQ unit 845 of the receiver 810 may generate an RLC/ARQ status report 1010, (for the identified logical channels, or for all AM logical channels if detailed information identifying the specific RLC AM instances are not included in the status report triggering signal 1005), and transmit the RLC/ARQ status report 1010 to the transmitter 805. The transmitter 805 may conduct an RLC/ARQ retransmission based on the information conveyed in the received RLC/ARQ status report 1010.

Additional Enhanced Schemes

Figure 11:
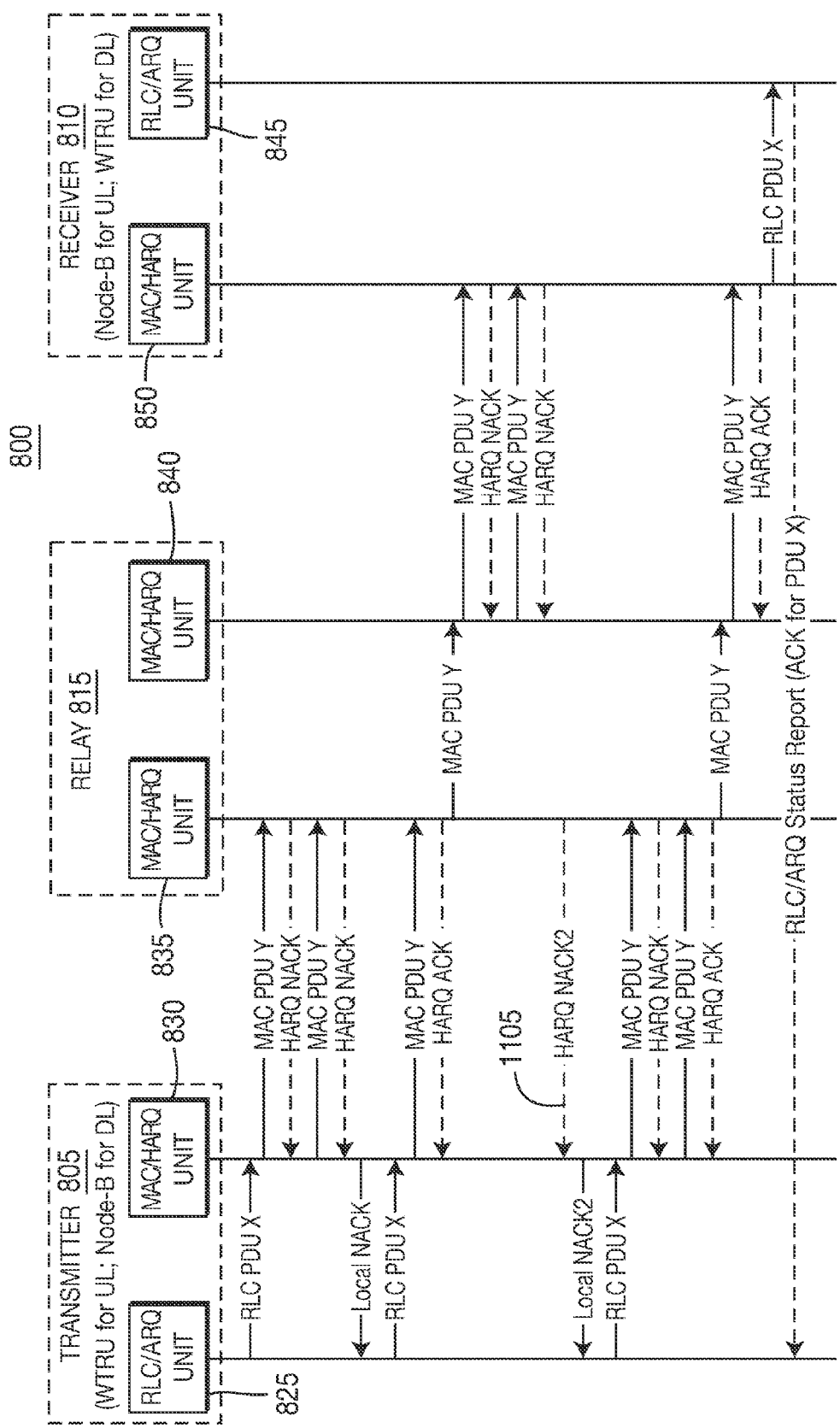
Figure 12:
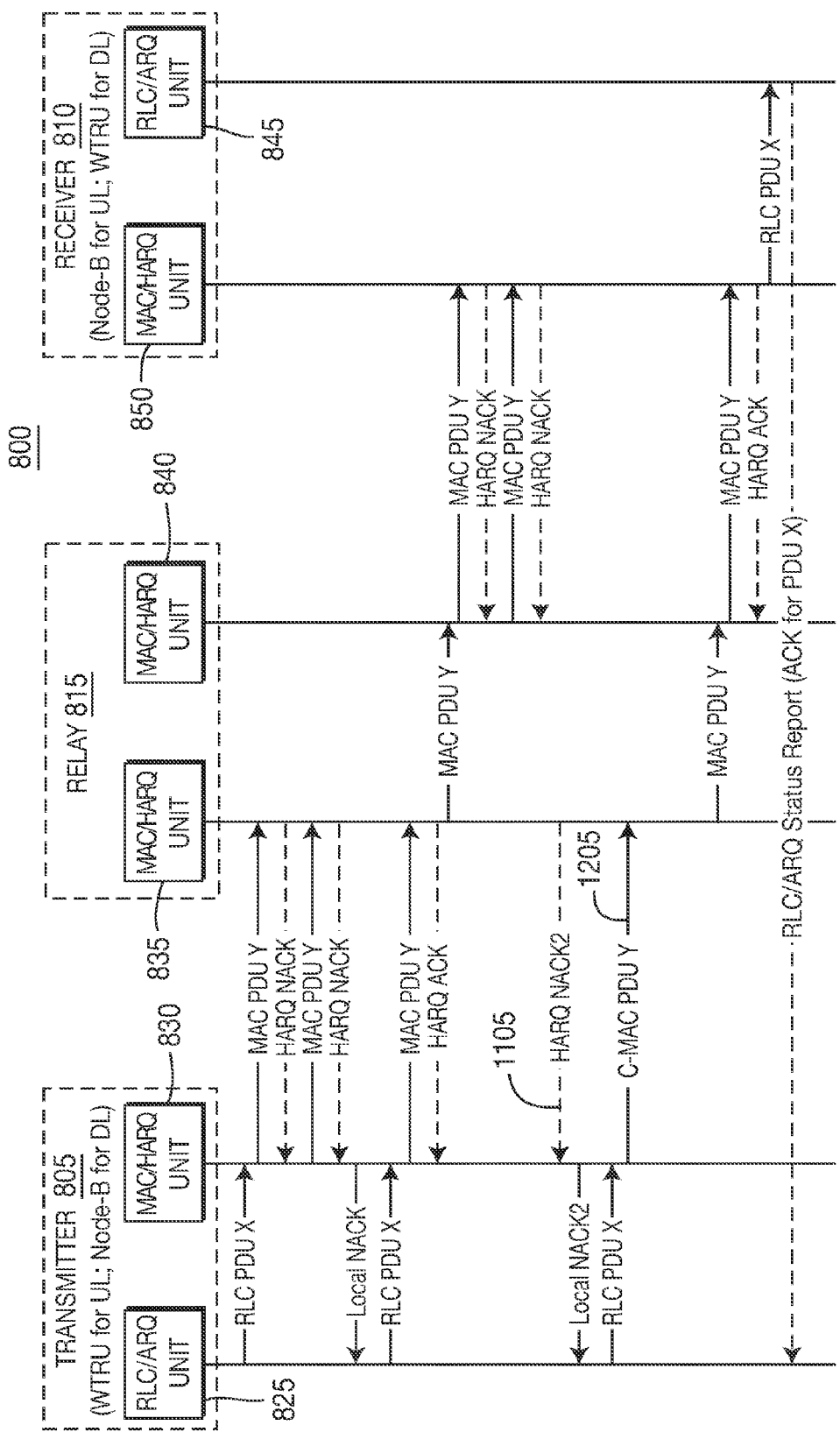
Figure 13:
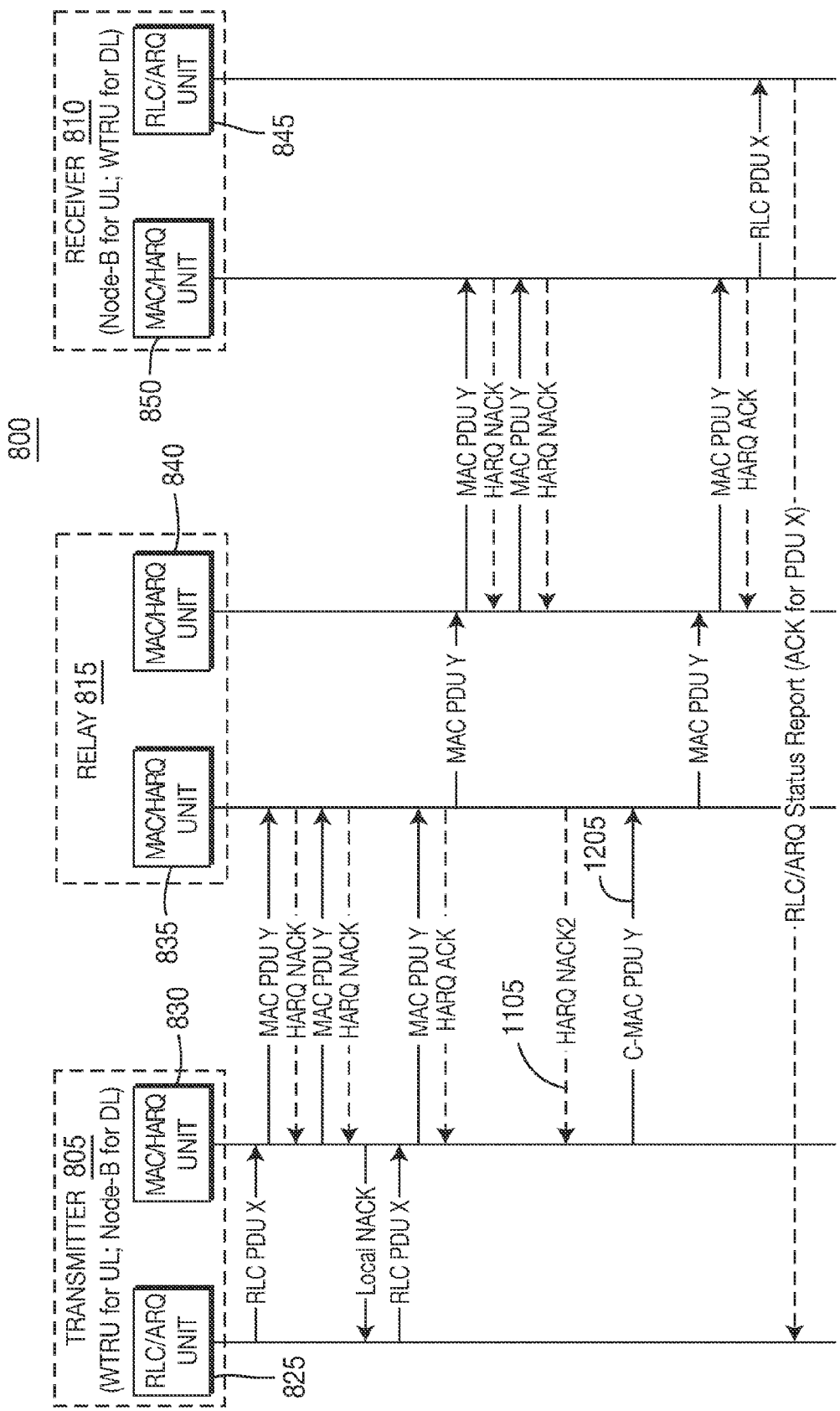

FIGS. 11-13 show alternative proposed enhanced schemes for the relay to trigger retransmissions when an HARQ process transmission failure occurs between the relay and the receiver. As shown in the Figures, an HARQ-NACK2 signal 1105 includes a new message that is transmitted from the MAC/HARQ unit 835 in the relay 815 to the MAC/HARQ unit 830 in the transmitter 805. The NACK2 signal 1105 is used to indicate that the MAC PDU Y was not received correctly. This signal updates the status HARQ process transmission status of MAC PDU Y that may have already received successful HARQ feedback, (i.e., the HARQ status changes from ACK to NACK).

In FIG. 11, the HARQ NACK 2 generates a Local NACK in the transmitter, which results in an RLC PDU X and associated MAC PDU Y retransmission to the relay.

As shown in FIGS. 12 and 13, upon HARQ NACK 2 reception and optionally local NACK processing for RLC PDU X retransmission, instead of retransmitting the associated MAC PDU Y, a C-MAC PDU Y control signal 1205 is transmitted from the MAC/HARQ unit 830 in the transmitter 805 to the MAC/HARQ unit 835 in the relay 815. The C-MAC PDU Y control signal 1205 is used to request a re-transmission of a MAC PDU Y, or some of the contents of MAC PDU Y. Since the relay has previously successfully received a MAC PDU Y that previously was not successfully sent to the receiver, it is not necessary to retransmit this data to the relay. The C-MAC PDU Y control signal 1205 requests the relay to retransmit the previously unsuccessfully transmitted MAC PDU Y to the receiver 810.

Referring to FIGS. 12 and 13, the relay 815 stores the MAC PDU Y, even after a HARQ retransmission failure in the relay 815, since it may have to retransmit the MAC PDU Y upon receiving the C-MAC PDU Y control signal 1205 from the transmitter 805. The exemplary procedures shown in FIGS. 12 and 13 may provide improved efficiency since the transmitter 805 does need not to retransmit the MAC PDU Y or some of its contents to the relay 815. Instead, the transmitter 805 transmits a control signal that requests/orders the relay to retransmit the stored PDU or some of its contents.

Figure 14:
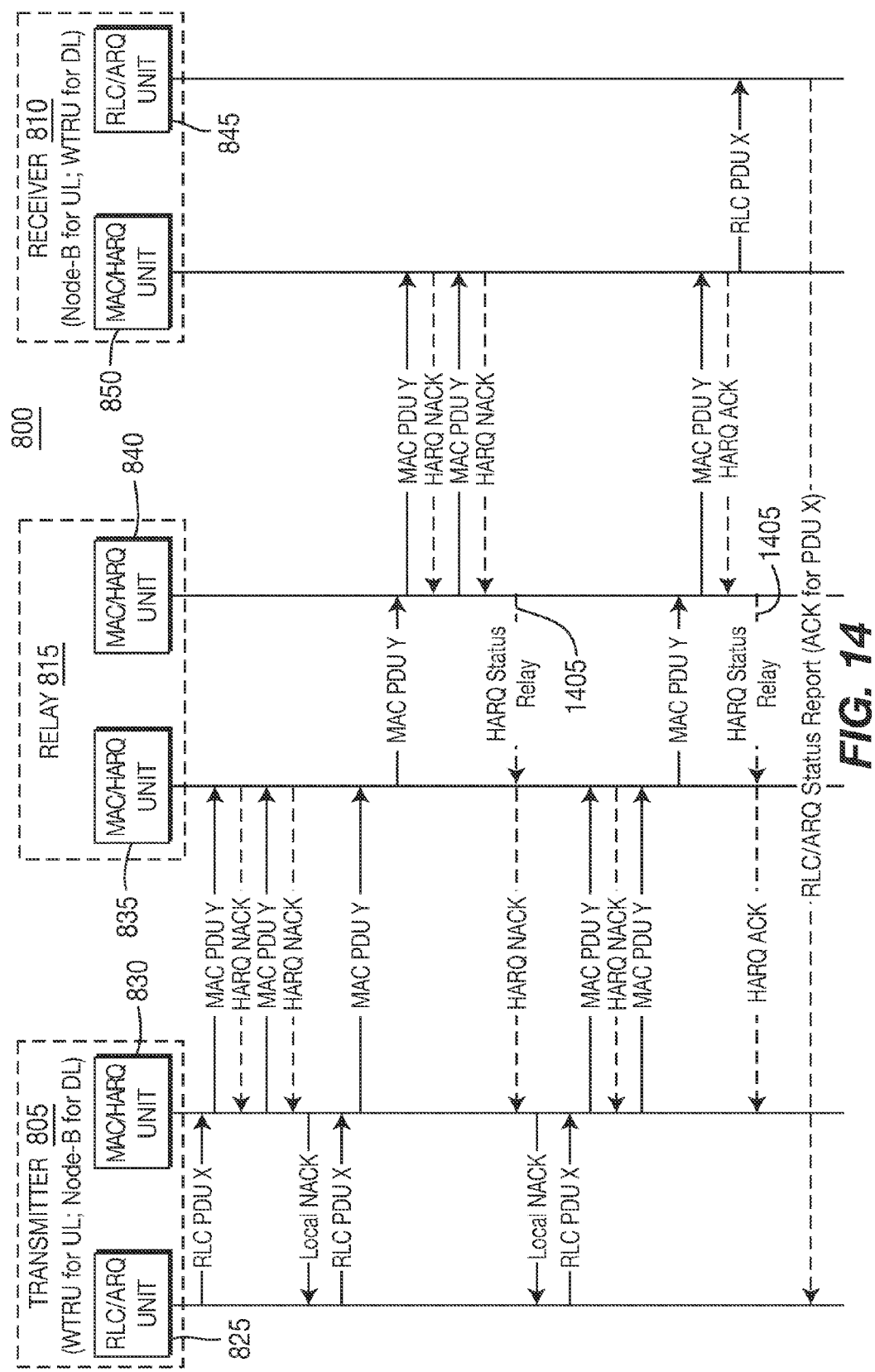

FIG. 14 shows another proposed enhanced scheme whereby an ARQ triggering signal may be supported by existing HARQ feedback signaling. In this scheme, an HARQ status relay indicator 1405 is transmitted by the MAC/HARQ unit 840 to the MAC/HARQ unit 835 in the relay 815. The HARQ operation in the transmitter 805 may be common with non-relay operation, (i.e., there is no need to apply new signaling for an ARQ triggering signal). This scheme may utilize asynchronous HARQ feedback since it may not be possible to guarantee the time of the relayed feedback from the receiver. The period from the HARQ transmission to transmission feedback may be variable. To support this, the HARQ process ID may be included in the feedback status. It may also be advantageous to apply feedback aggregation where feedback from multiple HARQ processes is identified in a single message.

A method of using a relay 815 to provide PHY and HARQ functionalities to a transmitter 805 and a receiver 810 is described below.

As shown in FIG. 8, a first RLC/ARQ unit 825 in the transmitter 805 generates an RLC PDU and forwards the RLC PDU to a first MAC/HARQ unit 830 in the transmitter 805 via signal 855. The first MAC/HARQ unit 830 in the transmitter 805 sends a MAC PDU that contains at least a portion of the RLC PDU to a second MAC/HARQ unit 835 in the relay 815 via signal 860. The second MAC/HARQ unit 835 in the relay 815 forwards the MAC PDU to a third MAC/HARQ unit 840 in the relay 815 via signal 878 and provides HARQ feedback to the first MAC/HARQ unit 830 in the transmitter 850 via signal 865 in response to receiving the MAC PDU. The third MAC/HARQ unit 840 in the relay 815 transmits the MAC PDU to a fourth MAC/HARQ unit 850 in the receiver 810 via signal 880. The third MAC/HARQ unit 840 in the relay 815 receives HARQ feedback sent by the fourth MAC/HARQ unit 850 in response to receiving the MAC PDU via signal 882.

A second RLC/ARQ unit 845 in the receiver 810 may transmit an RLC/ARQ status report 884 to the first RLC/ARQ unit 825 in the transmitter 805 to initiate a retransmission of the RLC PDU on a condition that an HARQ transmission failure occurs at the receiver 810.

As shown in FIG. 9, the relay 815 may transmit an ARQ triggering signal 905 to the first RLC/ARQ unit 825 in the transmitter 805 to initiate a retransmission of the RLC PDU on a condition that an HARQ transmission failure occurs at the receiver 810.

The ARQ triggering signal 905 may be signaled by a MAC control element (CE), an RLC control PDU or an RRC message. The ARQ triggering signal 905 may include an RLC logical channel, an RLC sequence number (SN), RLC segment information or HARQ process information and time of failure. The ARQ triggering signal 905 may cause RLC status report polling by the transmitter 805.

The transmitter 805 may reside in a WTRU and the receiver 810 may reside in a Node-B. Alternatively, the transmitter 805 may reside in a Node-B and the receiver 810 may reside in a WTRU.

As shown in FIG. 10, the relay 815 may transmit a status report triggering signal 1005 to the second RLC/ARQ unit 845 in the receiver 810 to initiate a transmission of an RLC/ARQ status report from the second RLC/ARC unit 845 in the receiver 810 to the first RLC/ARQ unit 825 in the transmitter 805.

The status report triggering signal 1005 may be signaled by a MAC CE, an RLC control PDU or an RRC message. The status report triggering signal 1005 may include an RLC logical channel, an RLC SN, RLC segment information or HARQ process information and time of failure. The status report triggering signal 1005 may cause RLC status report polling by the transmitter 805.

As shown in FIG. 11, the second MAC/HARQ unit 835 in the relay 815 may send an HARQ NACK2 indication 1105 to the first MAC/HARQ unit 830 in the transmitter 805 on a condition that an HARQ transmission failure occurs at the receiver 810. The first MAC/HARQ unit 830 in the transmitter 805 then sends a local NACK2 indication to the first RLC/ARQ unit 825 in the transmitter 805 to initiate a retransmission of the RLC PDU. As shown in FIG. 12, the first MAC/HARQ unit in the transmitter may then transmit a C-MAC PDU control signal 1205 to the second MAC/HARQ unit 835 in the relay 815 to initiate retransmission of the MAC PDU from the relay 815 to the receiver 810.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of using a relay to provide physical (PHY) and hybrid automatic repeat request (HARQ) functionalities to a transmitter and a receiver, the method comprising:
    a first radio link control (RLC)/automatic repeat request (ARQ) unit in the transmitter generating an RLC protocol data unit (PDU) and forwarding the RLC PDU to a first medium access control (MAC)/HARQ unit in the transmitter;
    the first MAC/HARQ unit in the transmitter sending a MAC PDU that contains at least a portion of the RLC PDU to a second MAC/HARQ unit in the relay;
    the second MAC/HARQ unit in the relay forwarding the MAC PDU to a third MAC/HARQ unit in the relay and providing HARQ feedback to the first MAC/HARQ unit in the transmitter in response to receiving the MAC PDU;
    the third MAC/HARQ unit in the relay transmitting the MAC PDU to a fourth MAC/HARQ unit in the receiver; and
    the third MAC/HARQ unit in the relay receiving HARQ feedback sent by the fourth MAC/HARQ unit in response to receiving the MAC PDU.

2. The method of claim 1 further comprising:
    a second RLC/ARQ unit in the receiver transmitting an RLC/ARQ status report to the first RLC/ARQ unit in the transmitter to initiate a retransmission of the RLC PDU on a condition that an HARQ transmission failure occurs at the receiver.

3. The method of claim 1 further comprising:
    the relay transmitting an ARQ triggering signal to the first RLC/ARQ unit in the transmitter to initiate a retransmission of the RLC PDU on a condition that an HARQ transmission failure occurs at the receiver.

4. The method of claim 3 wherein the ARQ triggering signal is signaled by a MAC control element (CE).

5. The method of claim 3 wherein the ARQ triggering signal is signaled by an RLC control PDU.

6. The method of claim 3 wherein the ARQ triggering signal is signaled by a radio resource control (RRC) message.

7. The method of claim 3 wherein the ARQ triggering signal includes an RLC logical channel.

8. The method of claim 3 wherein the ARQ triggering signal includes an RLC sequence number (SN).

9. The method of claim 3 wherein the ARQ triggering signal includes RLC segment information.

10. The method of claim 3 wherein the ARQ triggering signal includes HARQ process information and time of failure.

11. The method of claim 3 wherein the ARQ triggering signal causes RLC status report polling by the transmitter.

12. The method of claim 1 wherein the transmitter resides in a wireless transmit/receive unit (WTRU).

13. The method of claim 12 wherein the receiver resides in a Node-B.

14. The method of claim 1 wherein the transmitter resides in a Node-B.

15. The method of claim 14 wherein the receiver resides in a wireless transmit/receive unit (WTRU).

16. The method of claim 1 further comprising:
    the relay transmitting a status report triggering signal to a second RLC/ARQ unit in the receiver to initiate a transmission of an RLC/ARQ status report from the second RLC/ARC unit in the receiver to the first RLC/ARQ unit in the transmitter.

17. The method of claim 16 wherein the status report triggering signal is signaled by a MAC control element (CE).

18. The method of claim 16 wherein the status report triggering signal is signaled by an RLC control PDU.

19. The method of claim 16 wherein the status report triggering signal is signaled by a radio resource control (RRC) message.

20. The method of claim 16 wherein the status report triggering signal includes an RLC logical channel.

21. The method of claim 16 wherein the status report triggering signal includes an RLC sequence number (SN).

22. The method of claim 16 wherein the status report triggering signal includes RLC segment information.

23. The method of claim 16 wherein the status report triggering signal includes HARQ process information and time of failure.

24. The method of claim 16 wherein the status report triggering signal causes RLC status report polling by the transmitter.

25. The method of claim 1 further comprising:
the second MAC/HARQ unit in the relay sending an HARQ negative acknowledgement (NACK) indication to the first MAC/HARQ unit in the transmitter on a condition that an HARQ transmission failure occurs at the receiver; and
the first MAC/HARQ unit in the transmitter sending a local NACK indication to the first RLC/ARQ unit in the transmitter to initiate a retransmission of the RLC PDU.

26. The method of claim 1 further comprising:
the second MAC/HARQ unit in the relay sending an HARQ negative acknowledgement (NACK) indication to the first MAC/HARQ unit in the transmitter on a condition that an HARQ transmission failure occurs at the receiver; and
the first MAC/HARQ unit in the transmitter transmitting a MAC control (C-MAC) PDU control signal to the second MAC/HARQ unit in the relay to initiate retransmission of the MAC PDU from the relay to the receiver.

27. A relay for providing physical (PHY) and hybrid automatic repeat request (HARQ) functionalities to a transmitter and a receiver, the relay comprising:
a first medium access control (MAC)/HARQ unit configured to receive a MAC protocol data unit (PDU) from the transmitter that contains at least a portion of a radio link control (RLC) protocol data unit (PDU), and provide HARQ feedback to the transmitter in response to receiving the MAC PDU; and
a second MAC/HARQ unit configured to receive the MAC PDU from the first MAC/HARQ unit, transmit the MAC PDU to the receiver, and receive HARQ feedback from the receiver in response to receiving the MAC PDU.

28. The relay of claim 27 wherein the relay transmits an automatic repeat request (ARQ) triggering signal to the transmitter to initiate a retransmission of the RLC PDU on a condition that an HARQ transmission failure occurs at the receiver.

29. The relay of claim 28 wherein the ARQ triggering signal is signaled by a MAC control element (CE).

30. The relay of claim 28 wherein the ARQ triggering signal is signaled by an RLC control PDU.

31. The relay of claim 28 wherein the ARQ triggering signal is signaled by a radio resource control (RRC) message.

32. The relay of claim 28 wherein the ARQ triggering signal includes an RLC logical channel.

33. The relay of claim 28 wherein the ARQ triggering signal includes an RLC sequence number (SN).

34. The relay of claim 28 wherein the ARQ triggering signal includes RLC segment information.

35. The relay of claim 28 wherein the ARQ triggering signal includes HARQ process information and time of failure.

36. The relay of claim 28 wherein the ARQ triggering signal causes RLC status report polling by the transmitter.

37. The relay of claim 27 wherein the relay transmits a status report triggering signal to the receiver to initiate a transmission of an RLC/ARQ status report from the receiver to the transmitter.

38. The relay of claim 37 wherein the status report triggering signal is signaled by a MAC control element (CE).

39. The relay of claim 37 wherein the status report triggering signal is signaled by an RLC control PDU.

40. The relay of claim 37 wherein the status report triggering signal is signaled by a radio resource control (RRC) message.

41. The relay of claim 37 wherein the status report triggering signal includes an RLC logical channel.

42. The relay of claim 37 wherein the status report triggering signal includes an RLC sequence number (SN).

43. The relay of claim 37 wherein the status report triggering signal includes RLC segment information.

44. The relay of claim 37 wherein the status report triggering signal includes HARQ process information and time of failure.

45. The relay of claim 37 wherein the status report triggering signal causes RLC status report polling by the transmitter.

46. The relay of claim 27 wherein the relay sends an HARQ negative acknowledgement (NACK) indication to the transmitter on a condition that an HARQ transmission failure occurs at the receiver.

47. The relay of claim 46 wherein the relay receives a MAC control (C-MAC) PDU control signal to initiate retransmission of the MAC PDU from the relay to the receiver.

* * * * *